(12) United States Patent
Tsuji et al.

(10) Patent No.: US 9,039,440 B2
(45) Date of Patent: May 26, 2015

(54) CARD CONNECTOR

(71) Applicant: Tyco Electronics Japan G.K., Kanagawa-ken (JP)

(72) Inventors: Junya Tsuji, Tokyo (JP); Masaaki Iwasaki, Kanagawa (JP)

(73) Assignee: Tyco Electronics Japan G.K., Kanagawa-ken (JP)

(*) Notice: Subject to any disclaimer, the term of this patent is extended or adjusted under 35 U.S.C. 154(b) by 0 days.

(21) Appl. No.: 13/933,827

(22) Filed: Jul. 2, 2013

(65) Prior Publication Data

US 2014/0004735 A1 Jan. 2, 2014

(30) Foreign Application Priority Data

Jul. 2, 2012 (JP) .................. 2012-148716

(51) Int. Cl.
*H01R 3/00* (2006.01)
*H01R 13/66* (2006.01)
*G06K 7/00* (2006.01)

(52) U.S. Cl.
CPC .......... *H01R 13/6683* (2013.01); *G06K 7/0069* (2013.01)

(58) Field of Classification Search
CPC ..... G06K 7/00; G06K 13/08; G06K 13/0806; G06K 7/0069; H01R 13/635; H01R 13/633; H01R 13/6683; H05K 5/0295
USPC .................. 439/188, 489, 159–160, 630, 946
See application file for complete search history.

(56) References Cited

U.S. PATENT DOCUMENTS

| 6,692,276 | B1 * | 2/2004 | Abe et al. ...................... 439/188 |
| 6,899,557 | B2 | 5/2005 | Hirata |
| 7,137,836 | B2 * | 11/2006 | Lu et al. ........................ 439/188 |
| 7,887,348 | B2 * | 2/2011 | Matsumoto et al. .......... 439/188 |
| 8,465,308 | B2 * | 6/2013 | Gao et al. ...................... 439/188 |
| 2010/0248551 | A1 | 9/2010 | Harada |

* cited by examiner

*Primary Examiner* — Edwin A. Leon
(74) *Attorney, Agent, or Firm* — Barley Snyder (57) ABSTRACT

A card connector with a card insertion detection mechanism has a first movable terminal, and a second movable terminal. An abutting portion located on the first movable terminal is engageable with a card upon insertion to displace the first movable terminal from the second moveable terminal, and is disengageable from the card upon removal. A cam portion of the first movable terminal is positioned to contact the second movable terminal, and wipe with the second movable terminal.

12 Claims, 13 Drawing Sheets

CARD CONNECTOR

CROSS-REFERENCE TO RELATED APPLICATION

This application claims the benefit of the filing date under 35 U.S.C. §119(a)-(d) of Japanese Patent Application No. JP 2012-148716, filed Jul. 2, 2012.

FIELD OF INVENTION

The present invention relates to a card connector having a card insertion detection mechanism comprising a first movable terminal made of metal and a second movable terminal made of metal that are contactable with each other.

BACKGROUND

Conventionally, card connectors generally have a card insertion detection mechanism which detects when a card, such as a memory card or a Subscriber Identity Module ("SIM") card, is inserted.

Figure 13A:
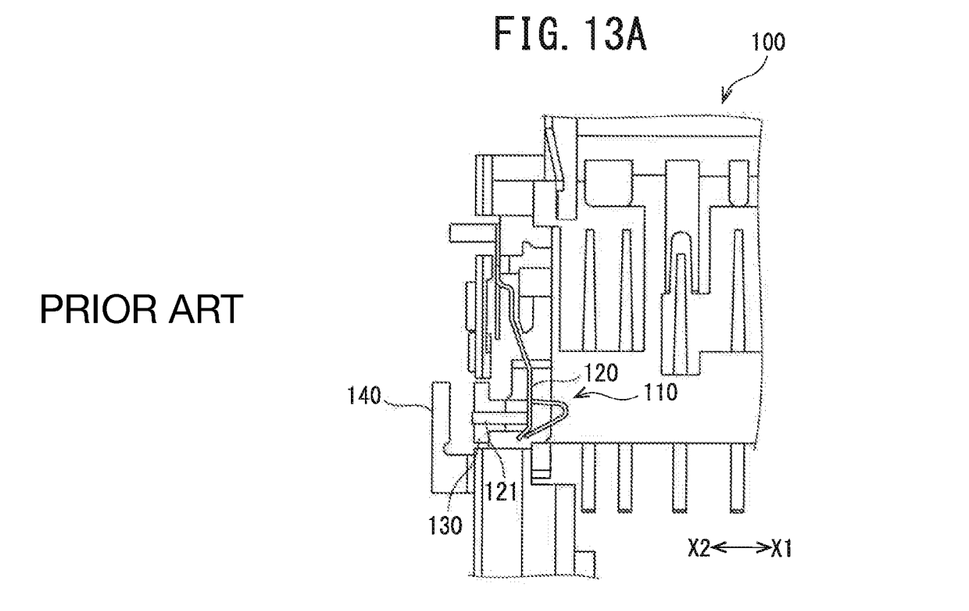
FIG. 13A is a partial top plan view of a conventional card connector where a shell is removed, without an inserted card.
Figure 13B:
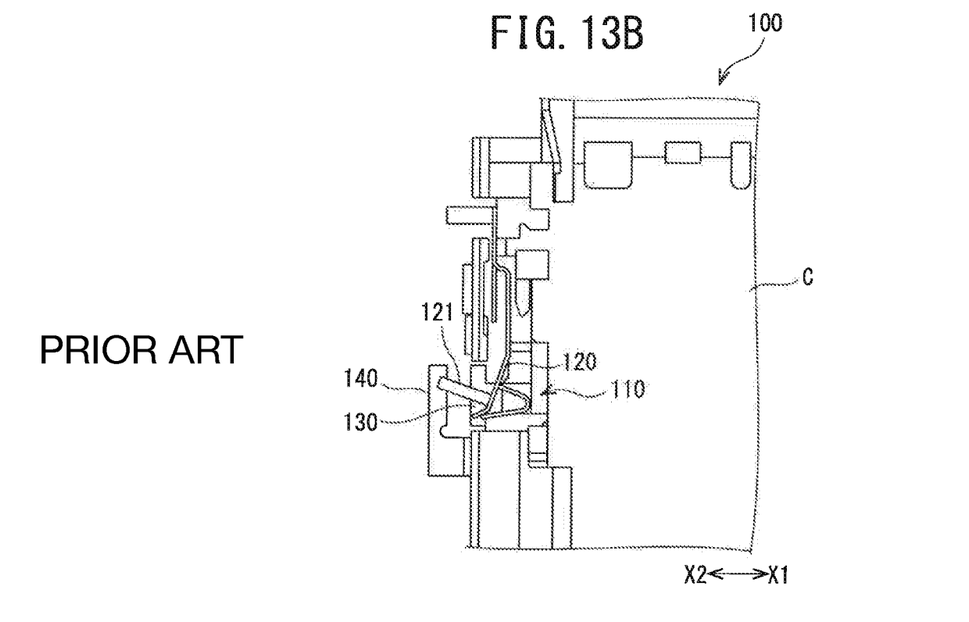
FIG. 13B is a partial top plan view of the conventional card connector with the shell removed, with an inserted card.

A conventional card connector 100 is shown in FIG. 13A and FIG. 13B, which illustrate a conventional card insertion detection mechanism 110 having: a movable terminal 120; a first fixed terminal 130; and a second fixed terminal 140.

When a card C is not inserted into the card connector, as shown in FIG. 13A, the movable terminal 120 is displaced in an X1 direction, and a wiping portion 121 of the movable terminal 120 is in contact with the first fixed terminal 130. In this state, the first fixed terminal 130 is in an ON state, whereas the second fixed terminal 140 is in an OFF state. The movable terminal 120, the first fixed terminal 130, and the second fixed terminal 140 are connected to a detection circuit, not shown. The detection circuit detects that the card C is not inserted by a combination of detection signals (ON/OFF) from the first fixed terminal 130 and the second fixed terminal 140.

When the card C is inserted, the movable terminal 120 is displaced in an X2 direction and the wiping portion 121 makes contact with the second fixed terminal 140, as shown in FIG. 13B. In this state, the first fixed terminal 130 is in OFF state, whereas the second fixed terminal 140 is in ON state. The detection circuit detects that the card C is inserted and the card C is positioned at a writable position by a combination of detection signals (ON/OFF) from the first fixed terminal 130 and the second fixed terminal 140.

In this situation, when the wiping portion 121 moves from the first fixed terminal 130 and makes contact with the second fixed terminal 140, the wiping portion 121 is configured to wipe the top faces of the first fixed terminal 130 and the second fixed terminal 140 to remove contaminants or oxidation therefrom.

However, the above described configuration presents a problem when the card C has been inserted and the wiping portion 121 of the movable terminal 120 is in contact with the second fixed terminal 140. The movable terminal 120 and the second fixed terminal 140 form a closed circuit, where a constant current is always flowing. Accordingly, there is constant power consumption during the duration the card C remains inserted. The total amount of power consumption can be significant, especially when the power source is a battery. During typical use, the period the card C is inserted into the card connector 100 is often longer than the period the card C is not inserted into the card connector 100, thereby consuming a large amount of power from the battery.

SUMMARY

An object of the present invention, among others is to provide a card connector in which an open circuit is formed by a first movable terminal and a second movable terminal constituting a card insertion detection mechanism when a card is inserted, thereby minimizing the power consumption of the battery of the equipment on which the card connector is mounted, and in addition, in which a wiping action occurs when the first movable terminal and the second movable terminal make contact with each other.

The invention is directed towards a card connector with a card insertion detection mechanism having a first movable terminal, and a second movable terminal. An abutting portion located on the first movable terminal is engageable with a card upon insertion to displace the first movable terminal from the second moveable terminal, and is disengageable from the card upon removal. A cam portion of the first movable terminal is positioned to contact the second movable terminal, and wipe with the second movable terminal.

BRIEF DESCRIPTION OF THE DRAWINGS

The invention will now be described by way of example with reference to the accompanying figures of which.

DETAILED DESCRIPTION OF THE EMBODIMENTS

Hereinafter, embodiments of the present invention will be described with reference to the drawings.

A card connector 1 illustrated in FIGS. 1-6 is mounted on a circuit board, not illustrated, such that a card C can be inserted into the card connector 1 and removed from the card connector 1. Examples of the card C include memory cards and SIM cards, however one of ordinary skill in the art would appreciate that other types of cards may also be used. The card C being inserted into the card connector is electrically connected to the circuit board.

The card connector 1 is provided with: a housing 10; contacts 20; a shell 30; a card insertion detection mechanism 40; and a card eject mechanism 70.

Figure 1:
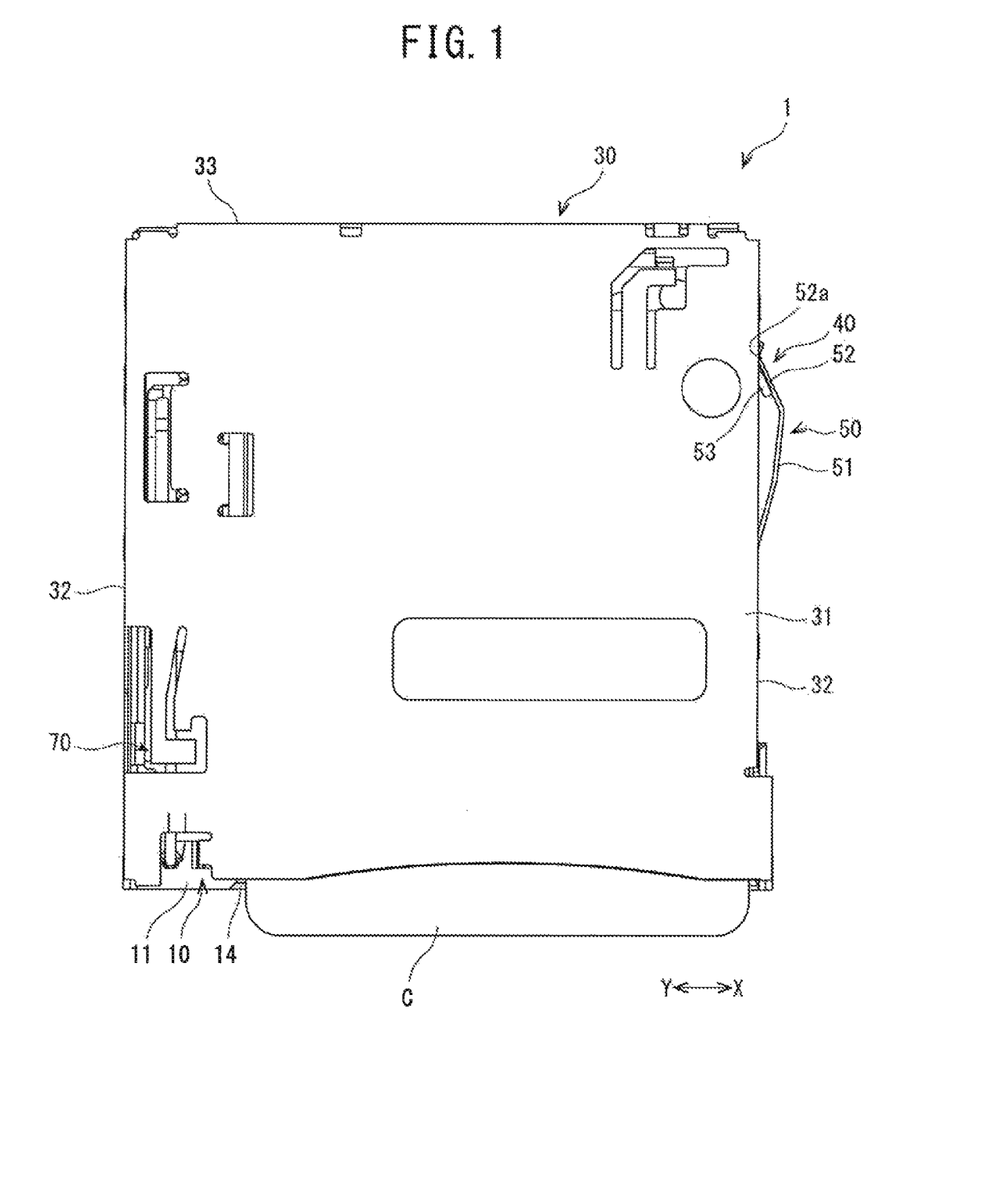
FIG. 1 is a top plan view of a card connector with an inserted card according to the present invention.
Figure 2:
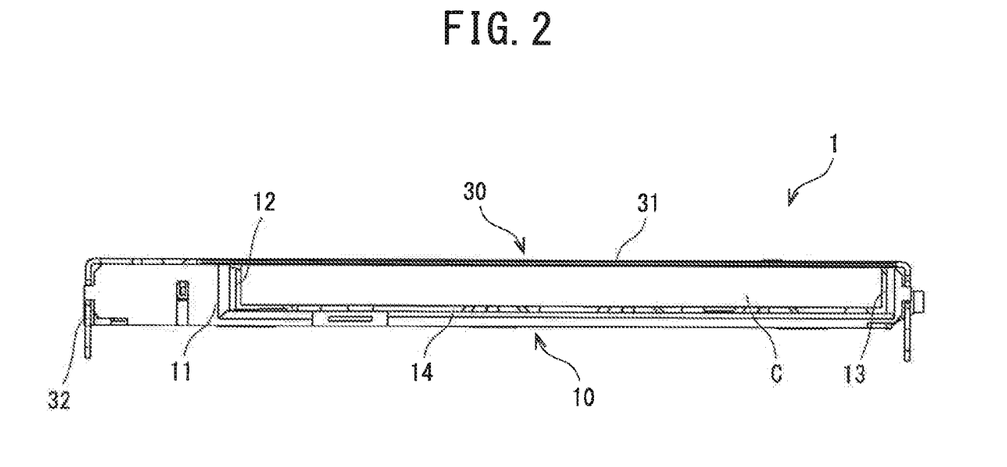
FIG. 2 is a front plan view of the card connector with an inserted card illustrated in FIG. 1.

The housing 10 is configured such that the card C is inserted into a card insertion space 14 located on a card receiving end as illustrated in FIG. 1. In an embodiment, the housing 10 is rectangularly shaped extending in a width direction (Y←→X direction in FIG. 1 and FIG. 4) and front-back direction, however, one of ordinary skill in the art will appreciate that other shapes can be used. The housing 10 can be formed by molding an insulating synthetic resin or other suitable insulating materials. The housing 10 has a card insertion space 14 having a first insertion guide 12 for the card C and a second insertion guide 13 for the card C. The left-side insertion guide 12 is arranged on an inner side wall 11 of the housing 10. When the card C is inserted into the card insertion space 14, the first insertion guide 12 guides a first face of the card C, and the right-side insertion guide 13 guides a second face of the card C.

Figure 7:
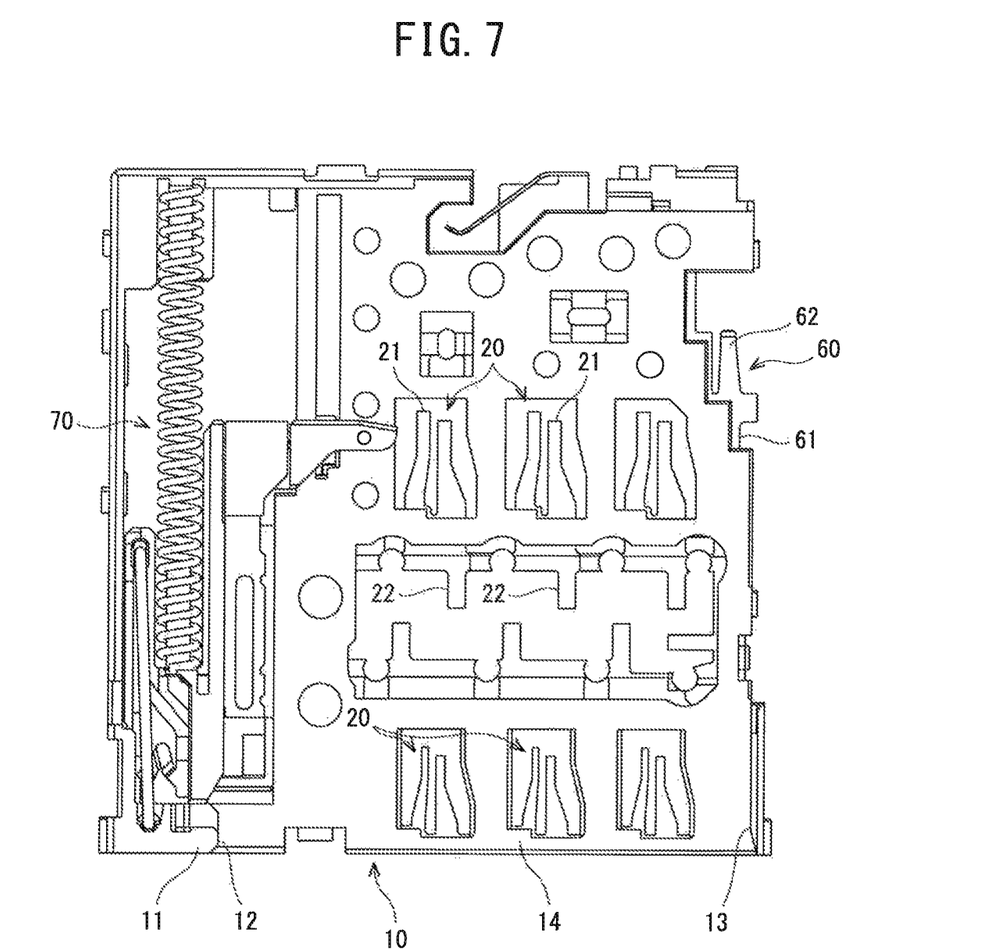
FIG. 7 is a top plan view of the card connector illustrated in FIG. 1 where a shell is removed, without an inserted card.

In one embodiment, a plurality of contacts 20 are arranged in at least one row disposed perpendicular to the side faces 32 of the housing 10. In another embodiment, a plurality of contacts 20 are arranged in at least two rows disposed perpendicular to the side faces 32 of the housing 10, as illustrated in FIG. 7.

Each contact 20 is provided with: a contact portion 21 for making contact with a conductive pad (not illustrated) provided on a surface of the card C; and a board connecting portion 22 for connecting to the circuit board. Each contact 20 is made by stamping and forming a conductive metal plate. When the card C is inserted into the card insertion space 14, the contact portion 21 makes contact with the conductive pad provided on the surface of the card C for electrical conduction.

The shell 30 is attached to the housing 10, as illustrated in FIG. 1-6, to cover at least a part of the housing 10. The shell 30 is provided with: a planar portion 31 covering the top face of the housing 10; a pair of opposing side face portions 32 extending from a card insertion end to a distal end of the housing 10; and a distal end face 33 of the housing 10. The planar portion 31 extends between the pair of side face portions 32 and between the card insertion end to the distal end of the housing 10. Each side face portion 32 extends perpendicular from the surface of the planar portion 31. The distal end face 33 extends perpendicular from the surface of the planar portion 31, and between the pair of opposing side face portions 32. The shell 30 is made by stamping and forming a conductive metal plate.

Figure 4:
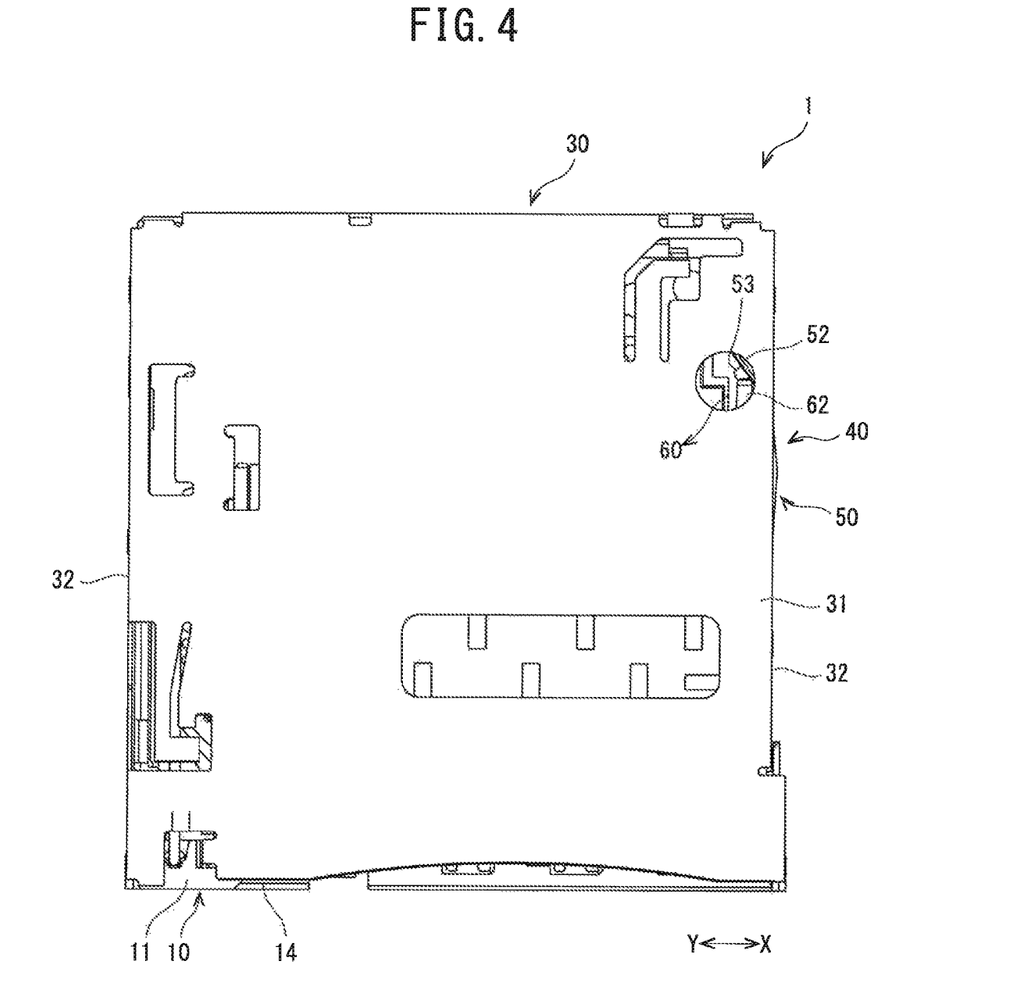
FIG. 4 is a top plan view of the card connector illustrated in FIG. 1, shown without an inserted card.
Figure 5:
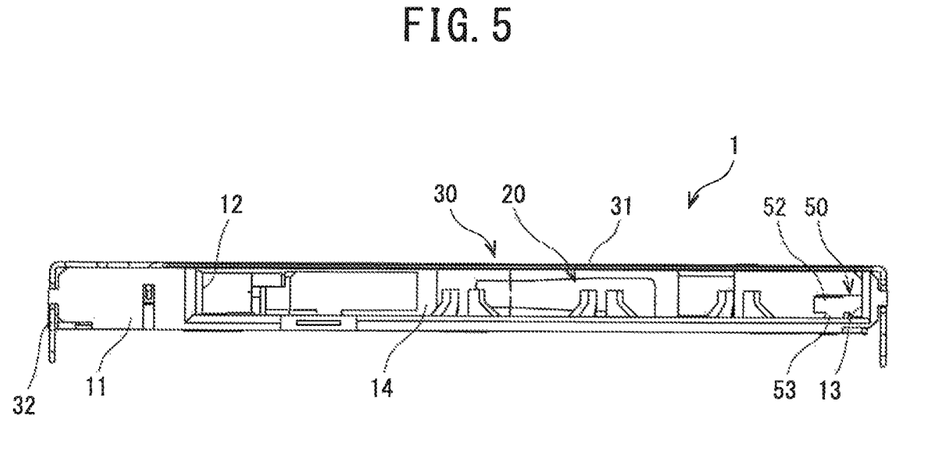
FIG. 5 is a front plan view of the card connector illustrated in FIG. 1, shown without an inserted card.
Figure 6:
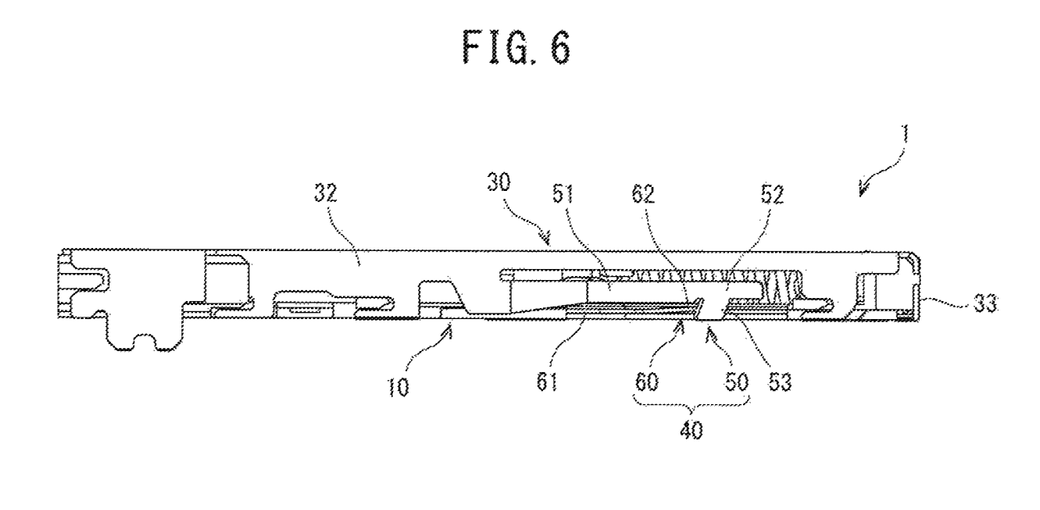
FIG. 6 is a right side plan view of the card connector illustrated in FIG. 1, shown without an inserted card.

The card insertion detection mechanism 40 is provided for detecting whether or not the card C is inserted into the card insertion space 14 of the housing 10, and is arranged on the side face portion 32 of the card connector 1, as illustrated in FIG. 1 and FIG. 4. The card insertion detection mechanism 40 is provided with: a first movable terminal 50; and a second movable terminal 60, which are contactable with each other. In an embodiment, both the first moveable terminal 50 and the second movable terminal 60 can be made of a conductive metal, although one of ordinary skill in the art would appreciate that other conductive materials could also be used.

The first movable terminal 50 is provided with: an outward extending portion 51 extending away from an outer surface of the side face portion 32 of the shell 30; and an abutting portion 52 located on a distal end of the outward extending portion 51 and extending obliquely inward towards an inner surface of the opposing side face portion 32. The abutting portion 52 has a curved portion 52a protruding inward towards the inner surface of the opposing side face portion 32. When the card C is inserted into the card insertion space 14, the card C abuts against an inner face of the abutting portion 52. Thus, the first movable terminal 50 is displaced outward, away from the outer surface of the side face portion 32, as indicated by an arrow X (see FIG. 1), with the fixed end of the outward extending portion 51 to the shell 30 as the center. Then, when the card C is fully inserted, the card C abuts against the curved portion 52a of the abutting portion 52. Thus, the first movable terminal 50 is displaced outward, away from the outer surface of the side face portion 32, as indicated by the arrow X, with the fixed end of the outward extending portion 51 to the shell 30 as the center. In addition, an edge of the abutting portion 52 is provided with a cam portion 53 extending inwardly towards the inner surface of the opposing side face portion 32, and obliquely from the inner face of the abutting portion 52 away from the inner surface of the planar portion 31 of the shell 30 and towards the housing 10.

Figure 8:
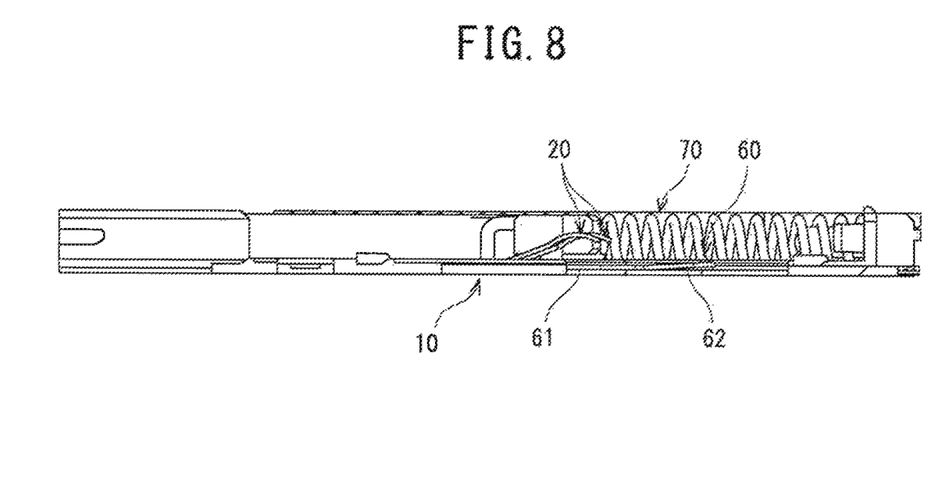
FIG. 8 is a right side plan view of the card connector illustrated in FIG. 1 where the shell is removed, without an inserted card.
Figure 9:
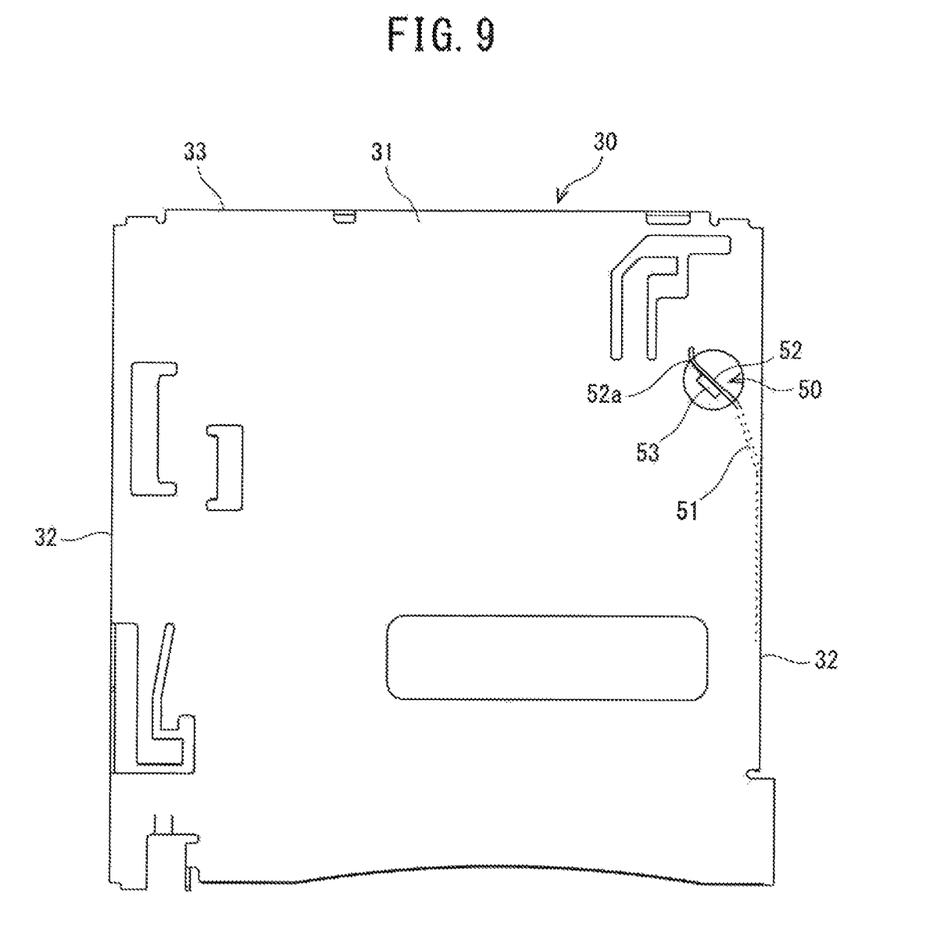
FIG. 9 is a top plan view of the shell used for the card connector illustrated in FIG. 1.
Figure 10:
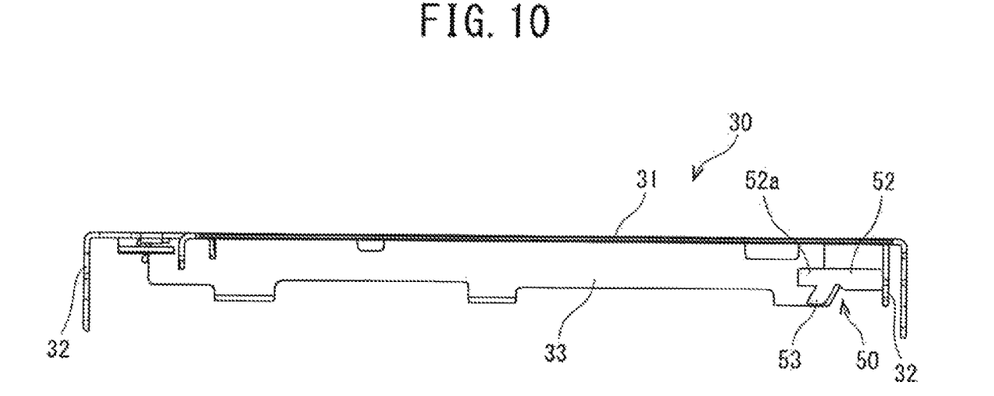
FIG. 10 is front plan view of the shell used for the card connector illustrated in FIG. 1.
Figure 11:
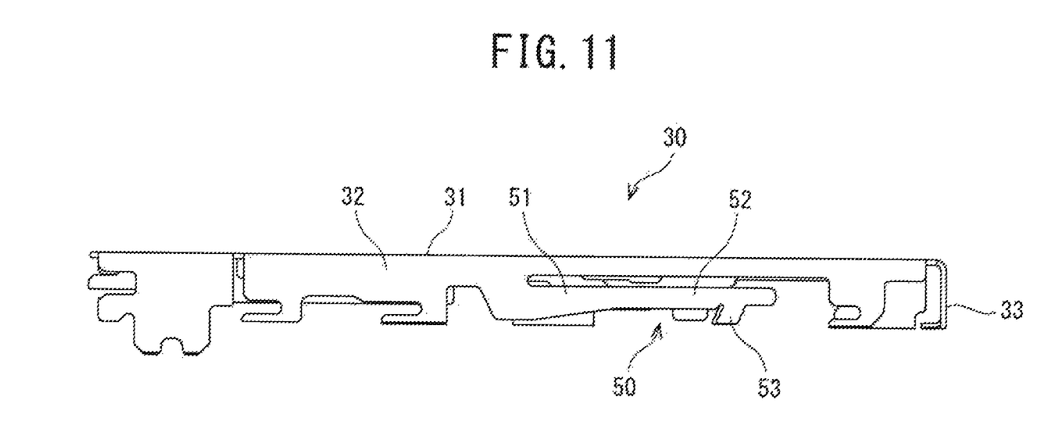
FIG. 11 is a right side plan view of the shell used for the card connector illustrated in FIG. 1.

In one embodiment, the second movable terminal 60 is attached to the housing 10 by insert molding, as illustrated in FIG. 3 and FIGS. 6-8, however, one of ordinary skill in the art would appreciate that in other embodiments, the second moveable terminal 60 is attached to other portions of the card connector 1. The second movable terminal 60 is made by stamping and forming a conductive metal plate or other suitable materials, and is provided with a planar portion 61 insert-molded to the housing 10. In one embodiment, the planar portion 61 is formed to have a substantially rectangular shape extending towards the inner surface of the opposing side face portion 32 and from the card insertion end towards the distal end of the housing 10. However, one of ordinary skill in the art would appreciate that other shapes could be used. The second movable terminal 60 has a contact piece portion 62 extending towards the distal end of the housing 10, and obliquely upward towards an inner surface of the planar portion 31 of the shell 30 in a cantilever shape, as is illustrated in FIG. 7 and FIG. 8. The contact piece portion 62 is capable of being displaced towards and away from the inner surface of the planar portion 31 with the fixed end to the planar portion 61 as the center.

When the card C is not inserted into the card insertion space 14, the contact piece portion 62 of the second movable terminal 60 is in contact with the inner face of the abutting portion 52 of the first movable terminal 50. Then, when the card C is inserted into the card insertion space 14, as illustrated in FIG. 1, the first movable terminal 50 is displaced outward, away from the outer surface of the side face portion 32 as indicated by the arrow X as described above, the abutting portion 52 of the first movable terminal 50 is separated from the contact piece portion 62 of the second movable terminal 60, and the contact state is released. Conversely, when the card C is removed from the card insertion space 14 as illustrated in FIG. 4, the first movable terminal 50 is displaced inward towards the inner surface of the opposing side face portion 32, as indicated by the arrow Y, and the abutting portion 52 of the first movable terminal 50 makes contact with the contact piece portion 62 of the second movable terminal 60.

Figure 12A:
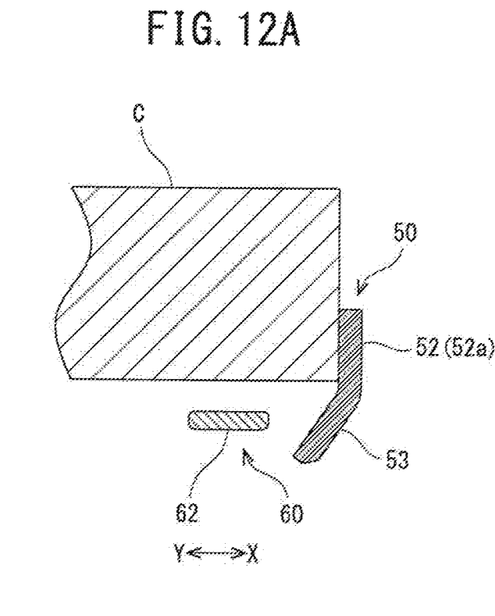
FIG. 12A is a cross-section of a state where the card is inserted, illustrating the card insertion detection mechanism.
Figure 12B:
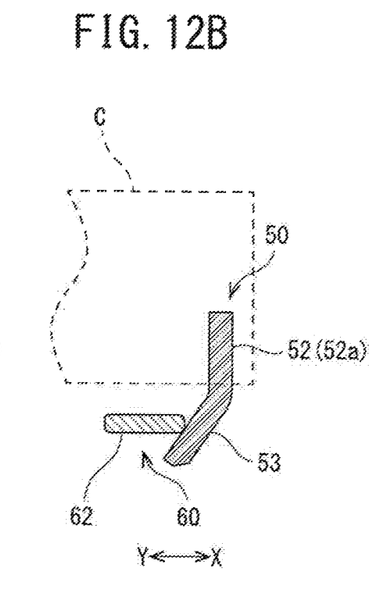
FIG. 12B is a cross-section of a state where the card is in the middle of being removed, illustrating the card insertion detection mechanism.
Figure 12C:
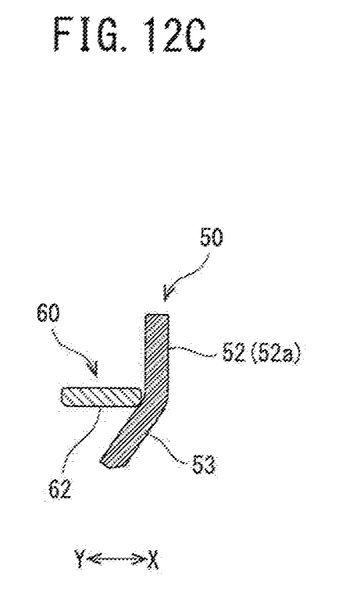
FIG. 12C is a cross-section of a state where the card has been removed, illustrating the card insertion detection mechanism.

The first movable terminal 50 and the second movable terminal 60 are connected to a detection circuit, not illustrated. The detection circuit detects that the card C is not inserted, when the first movable terminal 50 and the second movable terminal 60 are closed. In contrast, the detection circuit detects that the card C is inserted when the first movable terminal 50 and the second movable terminal 60 are open. As illustrated in FIGS. 12A-12C, the card insertion detection mechanism 40 performs as follows. When the card C is inserted into the card insertion space 14, the card C abuts against the abutting portion 52 of the first movable terminal 50. The first movable terminal 50 is displaced outward, away from the outer surface of the side face portion 32, as indicated by the arrow X. Then, when the card C is further inserted, as illustrated in FIG. 12A, the card C abuts against the curved portion 52a of the abutting portion 52, and the first movable terminal 50 is further displaced outward, away from the outer surface of the side face portion 32, as indicated by the arrow X. Thus, the abutting portion 52 of the first movable terminal 50 is separated from the contact piece portion 62 of the second movable terminal 60, and the first movable terminal 50 and the second movable terminal 60 disengage. In this situation, since the first movable terminal 50 and the second movable terminal 60 form an open circuit, the detection circuit detects the state where the card C is inserted. Therefore, in the state where the insertion of the card C is completed, the first movable terminal 50 and the second movable terminal 60 constituting the card insertion detection mechanism 40 form an open circuit. Accordingly, it is possible to minimize the power consumption of the battery of the equipment on which the card connector 1 is mounted.

It is to be noted that, once the card C is inserted, the first movable terminal 50 is displaced outward, away from the outer surface of the side face portion 32, and the abutting portion 52 of the first movable terminal 50 is displaced from the contact piece portion 62 of the second movable terminal 60. In this situation, as illustrated in FIGS. 12A-12C, the contact piece portion 62 of the second movable terminal 60 wipes the cam portion 53 of the first movable terminal 50, and is then displaced in a direction away from the inner surface of the planar portion 31 of the shell 30. After that, it is displaced from the first movable terminal 50. The first movable terminal 50 is displaced when the card C is inserted, such that the second movable terminal 60 wipes the cam portion 53 before being displaced from the first movable terminal 50. It is therefore possible to perform the wiping action with certainty when the first movable terminal 50 and the second movable terminal 60 are separated from each other.

When the card C is inserted into the card insertion space 14, each conductive pad arranged on the card C makes contact with the contact portion 21 of each contact 20 to establish an electrical connection between the card C and the circuit board.

Figure 3:
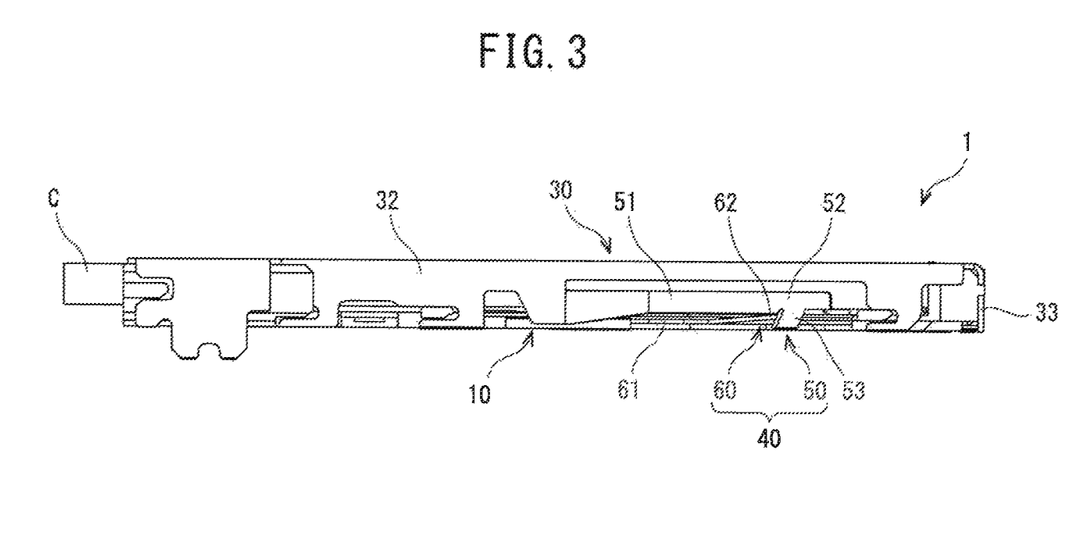
FIG. 3 is a right side plan view of the card connector with an inserted card illustrated in FIG. 1.

Additionally, when the card C is inserted into the card insertion space 14, the card C does not make contact with the contact piece portion 62 of the second movable terminal 60, as shown in FIG. 3.

To remove the card C from the card insertion space 14, the card C is pressed. The card eject mechanism 70 moves the card C forward. As illustrated in FIG. 12B, the abutment state of the curved portion 52a and the abutting portion 52 with the card C is released to drive the first movable terminal 50 to return to the original state whereby the first movable terminal 50 is displaced inward towards the inner surface of the opposing side face portion 32, as indicated by the arrow Y. Then, the cam portion 53 of the first movable terminal 50 abuts against the side edge of the contact piece portion 62 of the second movable terminal 60.

As illustrated in FIG. 12C, as the first movable terminal 50 is returning to the original state, the contact piece portion 62 of the second movable terminal 60 wipes the cam portion 53, and is then displaced upward in a direction towards the inner surface of the planar portion 31 of the shell 30. The displacement direction is directed by the cam portion 53 of the first movable terminal 50, which extends inwardly towards the inner surface of the opposing side face portion 32, and obliquely from the inner face of the abutting portion 52 away from the inner surface of the planar portion 31 of the shell 30 and towards the housing 10. Then, the contact piece portion 62 of the second movable terminal 60 makes contact with the abutting portion 52 of the first movable terminal 50 to form a closed circuit between the first movable terminal 50 and the second movable terminal 60, which the detection circuit interprets as the state where the card C is removed.

When the card C is removed from the card connector 1, the abutment state of the card C with the abutting portion 52 is released so that the first movable terminal 50 returns in an inward direction, towards the inner surface of the opposing side face portion 32, as indicated by the arrow Y. The cam portion 53 of the first movable terminal 50 abuts against the second movable terminal 60, and in addition, the second movable terminal 60 wipes the cam portion 53 and then makes contact with the abutting portion 52. It is therefore possible to perform the wiping action with certainty, when the first movable terminal 50 and the second movable terminal 60 make contact with each other. This makes it possible to remove the foreign matters adhered to one or both of the first movable terminal 50 and the second movable terminal 60, thereby allowing contact between the first movable terminal 50 and the second movable terminal 60 with certainty.

When the card C is removed, the contact piece portion 62 of the second movable terminal 60 wipes the cam portion 53 and is then displaced upward. The card C is positioned such that the contact piece portion 62 of the second movable terminal 60 does not make contact with the card C. Therefore, the contact piece portion 62 of the second movable terminal 60 is able avoid damage of the second movable terminal 60 by the card C during card C insertion into or removal from the card connector 1.

In an embodiment, the first movable terminal 50 extends from the shell 30 covering at least a part of the housing 10, and the second movable terminal 60 is attached to the housing 10 into which the card C is inserted. Thus, the first movable terminal 50 and the second movable terminal 60 constituting the card insertion detection mechanism 40 can be configured with a small number of the parts. In another embodiment, the first moveable terminal 50 is arranged on another location of the card connector 1, such as the housing 10 or other suitable location. In yet another embodiment, the second movable terminal 60 is arranged on another location of the card connector 1, such as the shell 30, or other suitable location.

While various embodiments of the present invention have been described above, one of ordinary skill in the art would recognize that these embodiments are exemplary and are not limited thereto, and that other modifications and improvements can be applied.

What is claimed is:
1. A card connector having a card insertion detection mechanism comprising:
a first movable terminal;
a second movable terminal;
an abutting portion of the first movable terminal being engageable with a card upon insertion to displace the first movable terminal from the second moveable terminal, and being disengageable from the card upon removal; and a cam portion of the first movable terminal positioned to contact the second movable terminal, and wipe with the second movable terminal.

2. The card connector according to claim 1, wherein during card insertion, the second movable terminal wipes the cam portion of the first movable terminal before displacement of the first movable terminal from contact with the second movable terminal.

3. The card connector according to claim 1, wherein during card removal, the second movable terminal wipes the cam portion before the second movable terminal contacts the abutting portion.

4. The card connector according to claim 1, wherein the first movable terminal is disposed on a shell covering at least a part of a housing, and the second movable terminal is disposed on the housing.

5. The card connector according to claim 1, wherein a circuit is opened by the first movable terminal disengaging from the second moveable terminal when the card is inserted.

6. The card connector according to claim 1, wherein a circuit is closed by the first movable terminal contacting the second moveable terminal when the card is removed.

7. A card connector comprising:
a housing;
contacts;
a shell; and
a card insertion detection mechanism having
a first movable terminal;
a second movable terminal;
an abutting portion of the first movable terminal being engageable with a card upon insertion to displace the first movable terminal from the second moveable terminal, and being disengageable from the card upon removal; and
a cam portion of the first movable terminal positioned to contact the second movable terminal, and wipe with the second movable terminal.

8. The card connector according to claim 7, further comprising a card ejection mechanism.

9. The card connector according to claim 7, wherein the first moveable terminal is disposed on the shell.

10. The card connector according to claim 7, wherein the second moveable terminal is disposed on the housing.

11. The card connector according to claim 7, wherein a circuit is opened by the first movable terminal disengaging from the second moveable terminal when the card is inserted.

12. The card connector according to claim 7, wherein a circuit is closed by the first movable terminal contacting the second moveable terminal when the card is removed.

* * * * *